Feb. 11, 1958 R. W. SONNENFELDT 2,823,257

NOISE IMMUNIZING CIRCUITRY FOR PULSE TRANSLATING SYSTEMS

Filed Aug. 25, 1954 2 Sheets-Sheet 1

INVENTOR.
RICHARD W. SONNENFELDT
BY
ATTORNEY

NOISE IMMUNIZING CIRCUITRY FOR PULSE TRANSLATING SYSTEMS

Filed Aug. 25, 1954 2 Sheets-Sheet 2

INVENTOR.
RICHARD W. SONNENFELDT
BY
[signature]
ATTORNEY

United States Patent Office 2,823,257

Patented Feb. 11, 1958

2,823,257

NOISE IMMUNIZING CIRCUITRY FOR PULSE TRANSLATING SYSTEMS

Richard Wolfgang Sonnenfeldt, Haddonfield, N. J., assignor to Radio Corporation of America, a corporation of Delaware Application August 25, 1954, Serial No. 452,028

6 Claims. (Cl. 178—7.3)

The invention relates to pulse translating systems and it particularly pertains to pulse separating circuits for deriving the vertical and horizontal synchronizing pulses from a composite video wave signal in a television receiver with a minimum of disturbance from extraneous noise pulses which may be present.

Information systems are often based on the translation of pulses of electric energy occurring in a specific time or amplitude relationship to each other or to reference or other synchronizing pulses. Other intelligence transmission systems involve electric energy of varying values between operating or synchronizing pulses. An example of one such system is the television system presently in use in the Western Hemisphere.

In this television system, the composite video signal transmitted to the receiver comprises a high frequency picture component interspersed at regular intervals with synchronizing pulses which are utilized at the receiver to maintain the electron beam position in the receiver image reproducing device in exact correspondence with electron beam position in the transmitter pickup or camera device. Television system synchronizing pulses all attain the same maximum amplitude, and comprise relatively narrow horizontal synchronizing pulses which recur at the rate of 15.75 kc. and wider vertical synchronizing pulses which recur at the rate of 60 C. P. S. Both of the synchronizing pulses are based on a constant amplitude blanking pulse which sets the black level of picture brightness. No picture information appears above the blanking level since the image reproducing device is biased to cut off at the black level.

In practice, the different types of pulses are distinguished by thresholding for amplitude variations, by differentiating and/or by integrating in known circuits designed for that purpose.

In present television practice, the circuit for separating the synchronizing pulses from the picture information generally comprises means for biasing an electron tube or other controlled electron flow path device to cutoff for all values of applied voltage at or below the blanking level. Above that level, where ony synchronizing pulses exist, except for extraneous noise pulses, the tube conducts and the synchronizing pulses are passed free of any picture information.

The conventional pulse separating circuits are designed to respond to the predetermined information pulses, such as the horizontal and vertical synchronizing pulses of a television system, and to remain insensitive to extraneous noise pulses which are usually of relatively short duration and low amplitude with respect to those characteristics of the information pulses. In some cases, however, the noise pulses exceed the amplitude and duration of the information pulses. For this reason many of the information pulse signal separating circuit arrangements used in the prior art were designed with rather close tolerances in order to reduce the tendency to respond to extraneous noise pulses.

It has been suggested in television work to isolate the synchronizing pulse separating circuit from frequencies lower than the synchronizing pulse repetition rate. One such arrangement uses a series capacitor charging path in the input of the separating circuit, having a long time constant with respect to the synchronizing pulse repetition rate. This arrangement is particularly effective since a great deal of pulse noise is of a type of repetition frequency substantially lower than the synchronizing pulse frequency. This type of circuit arrangement, however, also isolates the separating circuit from direct current flow. Because automatic gain control (A.-G.-C.) circuits operate on the direct component of the video signal, the synchronizing pulse separating circuit is not suitable for providing noise immune automatic gain control potential, which arrangement is highly desirable in all present day television receivers. A noise susceptible A.-G.-C. circuit also will tend to reduce receiver sensitivity as the noise pulse amplitude or duration increases beyond that of the synchronizing pulses, and also will require a certain recovery time after a noise pulse is encountered. Hence, the receiver may not only show no picture in that interval, but may go entirely out of synchronization if the noise pulses are repetitive.

It has also been suggested that noise cancellation circuits be used for preventing extraneous noise pulses from affecting the synchronizing pulse separator circuit of a television receiver. In such arrangements a noise impulse potential is derived from a stage of the television receiver and applied in the proper phase and polarity to cancel the corresponding noise impulse potentials at the input terminals of the synchronizing pulse separating circuit to render the pulse signals applied to the synchronization circuits relatively noise free. In one of the most popular applications of this principle, overload pulses are developed in the screen grid circuit of the final intermediate frequency (I.-F.) amplifier stage and used for cancelling noise pulses obtained from the video signal amplifying stage as applied at the input of the synchronizing pulse separating circuit. This noise inversion circuit, as the type of circuit is popularly termed, is most effective while the video amplifier is limiting noise amplitude to exceed the amplitude of the synchronizing pulses by only a small amount. In many instances, however, noise pulses at the output of the video wave signal amplifying circuit exceed the amplitude of the synchronizing pulses by a large amount, especially in weak signal areas.

An object of the invention is to improve the immunity of television circuits to extraneous noise impulses.

Another object of the invention is to provide improved circuitry for cancelling noise pulses at the input of synchronizing pulse separating circuits.

A further object is to provide a source of operating potential for automatic gain control circuits for television receivers which is immune to noise generated in the video wave signal amplifying channel.

A still further object is to provide improved noise cancellation circuitry which is effective for even the weakest signals received.

Still another object of the invention is to provide noise cancellation circuitry in which the overload pulses derived for noise cancellation purposes need not be proportional to the corresponding noise pulses obtained at the video frequency wave signal output circuit.

The objects of the invention are obtained in intelligence and information transmission systems by novel cancellation and clamping circuitry coupled to the pulse translating portions of the circuit arrangements. In the particular application of the invention to television systems, the objects are attained in television receiving circuit arrangements comprising a high frequency signal wave translating circuit from which the high frequency video frequency modulated signal wave is developed for demodulation and wherein those noise pulses exceeding the video modulation signal amplitude are developed for noise cancellation. The video modulation signal wave is obtained from the demodulating circuit and applied to a video modulation frequency signal wave amplifying circuit for application to the desired utilization device, usually an image reproducing device or kinescope. The output of the video modulation signal wave amplifying circuit is also applied through a noise pulse discriminating circuit to the input of a synchronizing pulse separating circuit along with the noise pulse potentials derived from the final high frequency signal wave translating circuit. The noise discriminating circuit is arranged to substantially eliminate the effect of any noise pulses of repetition rate lower than that of the synchronizing pulses.

The noise discriminating circuit according to the invention comprises a resistance-capacitance network including a series section comprising a capacitance element and a resistance element connected in parallel and coupled to a mixed section comprising a series arm having a capacitive component of value very much higher than that of the capacitance element and a resistive component of value considerably larger than the resistance element shunted across the output terminals of the network. The resistance and capacitance elements are chosen to offer minimum impedance to the horizontal synchronizing pulses so that after a few pulses have passed the capacitive component is charged to a value just equal to the amplitude of the horizontal synchronizing pulses. The vertical synchronizing pulses have the same amplitude as the horizontal pulses and the pulse widths are such that the capacitive component will be discharged very little. The amplitude of the noise pulses to be eliminated is much greater than that of the synchronizing pulses but the duty-cycle is much smaller so that the noise pulses will be passed across the capacitance element but cannot charge the capacitive component rapidly. By means of this circuit all the troublesome noise pulses of high intensity and low duty cycle are substantially ineffective at the input of the synchronizing pulse separating circuit. The composite video signal after passing through the noise discriminating circuit is clamped so that the noise pulses which pass the discriminating circuit exceed the amplitude of the synchronizing pulses by an amount depending on the noise frequency, the amplitude and the duty cycle factor but always reduced with respect to the original value. The noise pulses obtained from the last high frequency amplifier are therefore effective for noise cancellation at even the weakest signals, since the amplitude of the overload pulses need not be comparable to the noise pulses in the output of the video amplifier circuit as in prior cancellation circuits.

More particularly, in one embodiment of the invention a separate clamping device is used, whereby a synchronizing pulse separating and combined A.-G.-C. bias developing circuit may be used.

According to another embodiment of the invention the synchronizing pulse separating circuit comprises a controlled electron flow path device, usually in the form of a vacuum tube, having a common circuit element, or cathode, which is connected to ground directly or through an impedance which is low with respect to the impedance of the device when conducting, whereby the portion of the controlled electron flow path device between the input circuit element and the common circuit element, or between the grid and cathode of a vacuum tube, forms the clamping element as well as the input circuit of the synchronizing pulse separating circuit.

In order that the invention may be more clearly understood and readily put to practice, descriptions of several embodiments, by way of example only, are given below with reference to the accompanying drawing forming a part of the specification and in which.

Figure 1:
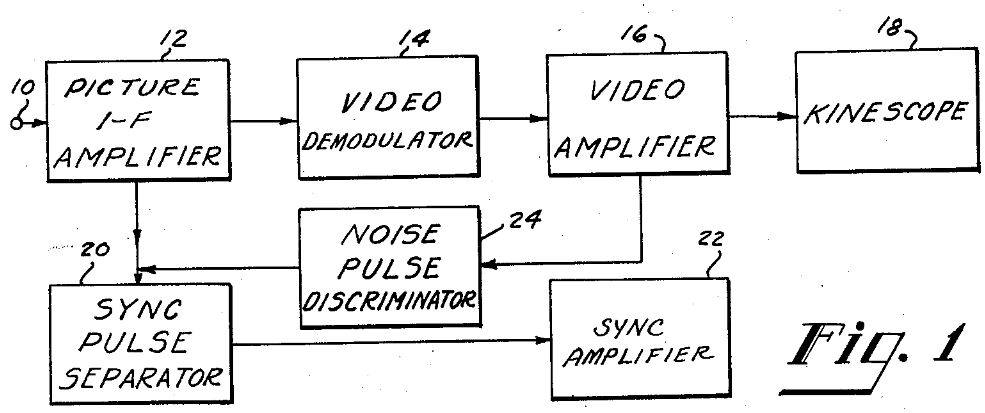
Fig. 1 is a functional diagram of a portion of television receiver modified according to the invention.

Referring to Fig. 1, there is shown a functional diagram of portions of a television receiver of predominantly conventional circuitry and portions incorporating circuitry according to the invention. In such a receiver, television signals appearing at an antenna are applied to a radio frequency (R.-F.) amplifier, and the output therefrom is applied along with a wave from a local oscillator to a frequency converter. The high frequency wave modulated by a composite video signal which has synchronizing pulse elements obtained at the output of the frequency converter is applied to a high frequency signal wave translating circuit in the form of either dual-channel, Pix and Vox intermediate frequency (I.-F.) amplifiers (not shown) or at input terminals 10 to an intermediate frequency amplifier 12 amplifying both pix and vox I.-F. signals as shown. A demodulating circuit 14 is coupled to the high frequency wave translating circuit 12 as shown for deriving the video wave from the television signals. The detected composite video wave signal is amplified in a video modulation signal amplifying circuit 16 and thereafter applied to the input circuit of a utilization device which in this case is an image reproducing device or kinescope 18. Sound signals are derived from the converter, or the I.-F. amplifier 12 or preferably the demodulator 14 for further processing in cascaded circuits comprising a vox I.-F. amplifier, an audio modulation discriminator, an audio frequency amplifier and a transducer or speaker (all of which are omitted in the interest of clarity, since they are conventional in all respects). The output of the video amplifier 16 is also applied to a synchronizing pulse separating circuit 20, by way of a noise pulse discriminating circuit 24, to separate the synchronizing pulses from the image information and the vertical synchronizing pulses from the horizontal for respective application to the vertical synchronizing pulse amplifier 22 and a horizontal synchronizing pulse amplifier (not shown). A known A.-G.-C. amplifier and distribution network (not shown) is coupled to the synchronizing pulse separating circuit 20 to supply control potential to the desired ones of the circuits previously mentioned. Usually the R.-F. and I.-F. circuits at least are so supplied. A vertical deflection generator, a horizontal sweep oscillator and deflection generator, and a high voltage generator coupled to the horizontal deflection generator (all of which are conventional and therefore not shown) are utilized to apply vertical and horizontal deflection and second anode potential to the kinescope 18.

According to the invention the composite video signal from the video amplifier 16 is applied to the synchronizing pulse separating circuit 20 through the intermediary of the noise pulse discriminating circuit 24 which is arranged to pass both horizontal and vertical synchronizing pulses and to render all noise pulses of high intensity and short duration and frequency lower than the frequency of the synchronizing pulses substantially ineffective or reduced in amplitude to a value exceeding the amplitude of the synchronizing pulses by only a small margin. Further according to the invention the high frequency wave signal amplifying circuit 12 is arranged to derive noise pulses of amplitude greater than the instantaneous amplitude of the modulation component for application to the input of the synchronizing pulse signal separating circuit 20 along with the output from the noise pulse discriminating circuit 24. The number of stages of amplification between the point at which the noise pulses are derived in the high frequency amplifying circuit 12 and the video wave signal amplifying circuit 16 is such that the polarities of the noise potentials as mixed in the input of the synchronizing pulse separating circuit 20 are in opposition or polarity reversing means are included in one or more of the noise pulse translating circuits to obtain such reversal. The amplitude of noise pulses from the high frequency amplifying circuit 12 is greater than the amplitude of the corresponding noise pulses as produced at the output of the noise pulse discriminating circuit 24, whereby all noise pulses which do pass through the noise pulse discriminating circuit 24 are effectively cancelled at the input of the synchronizing pulse separating circuit 20, thus rendering the latter circuit substantially immune from extraneous noise pulse voltages which may occur in the television reeciver.

Figure 2:
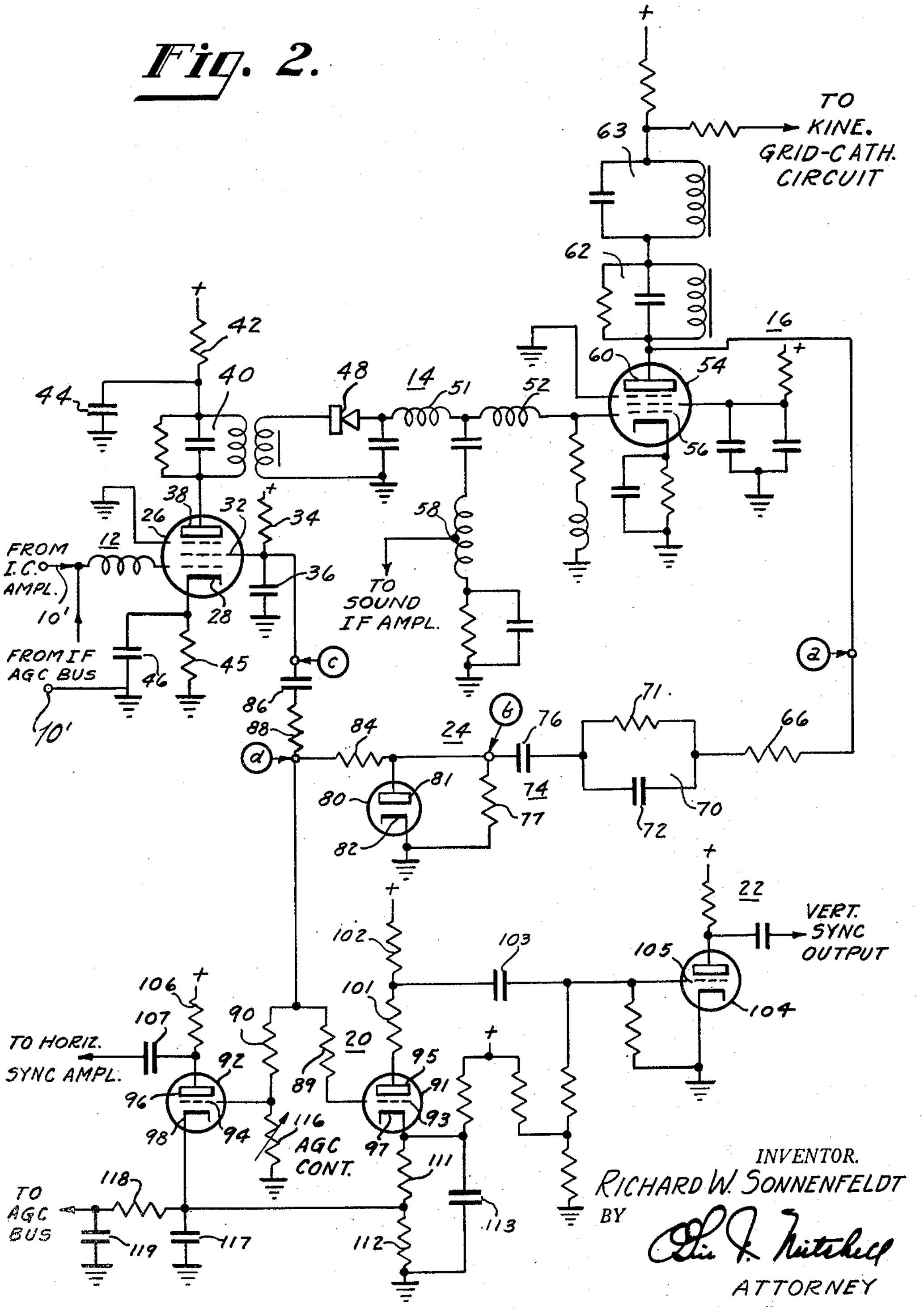
Fig. 2 is a schematic diagram of a specific example of an embodiment of the circuit arrangement outlined in Fig. 1.

An example of a circuit arrangement for performing the functions of the circuit outlined in Fig. 1 is given by the schematic diagram of Fig. 2. In this figure only a single stage of the I.-F. amplifier 12 having a controlled electron flow path structure in the form of an electron discharge device or pentode vacuum tube 26 is shown as any other stages that may be used may be entirely conventional. The input signal is applied by way of the input terminals 10' between the common circuit electrode or cathode 28 and the input circuit electrode or control grid 30. Another electrode or screen grid 32 is connected to a source of direct operating potential by means of a resistor 34 and bypassed by means of a capacitor 36. An output circuit electrode or anode 38 is connected to a load element 40 through which direct operating potential is applied by way of a resistor 42. Operating potentials of proper value are applied to the I.-F. amplifier tube 26 according to known practice to provide operational characteristics wherein the tube is held to the linear or straight amplification portion of the characteristic curve for the entire video-frequency modulated high-frequency wave signal, but is overloaded and driven to the non-linear portion, that is the detection portion for signals in excess of this normal signal, such as strong noise pulses. The tube circuit is thus arranged so that no rectification occurs in the presence of video-frequency-modulated high-frequency wave signal only, but does occur due to normal tube non-linearity when noise pulses in excess of the video frequency signal are present. Otherwise, cancellation of synchronizing pulses, as well as noise pulse cancellation, might occur in subsequent circuits which would defeat the operation of the circuit in accordance with the invention. Preferably automatic gain control is applied as shown so that the acceptance curve may be selected to remain very close to the peak of the synchronizing pulses. The screen grid circuit responds in much the same manner as the anode circuit so that the screen grid 32 of the I.-F. amplifier tube 26 is utilized as an output electrode of a simplified noise detector and amplifier, without the provision of extra amplification stages and without interfering with the normal functioning of the circuit. Amplified noise signals of negative polarity are therefore available between the screen grid 32, or the point *c*, and ground. Of course, the anode 31 may be used as the noise output electrode if desired, but since the screen grid 32 rises and falls with the anode 38 and the screen grid circuit of the high frequency amplifier tube 26 is degenerative to noise frequencies only, the screen grid 32 is preferred. Not only does this provide amplified noise at the output or screen grid 32 but it simultaneously decreases the output noise at the anode 38 of the tube 26 and at the subsequent video amplifier tube 54. Accordingly this manner of operation alone decreases noise response and therefore further amplification of the noise becomes unnecessary for operation of the noise inverter circuit to cancel noise signal at the output of the noise discriminating circuit 24. Likewise, the noise energy applied to the kinescope is decreased and an improved picture is obtained.

The modulated intermediate frequency wave across the load element 40 is induced in the demodulator circuit which is inductively coupled thereto and the voltage is rectified by means of a detector element 48 and directly applied by way of a pair of peaking coils 51 and 52 to the input of the video frequency amplifier circuit 16 comprising a controlled electron flow path structure in the form of a pentode vacuum tube 54 having a control grid 56 which is connected to the peaking coil 52. The circuit arrangement as shown is for the intercarrier type of television receiver and the sound signal is taken off by means of a sound trap 58 leaving video signals only applied to the control grid 46. Obviously, the older separate picture I.-F. amplifier and detector circuit, could be used with equal effect. The output circuit of the video amplifier tube 54, comprising the two tuned load circuits 62, 63 is coupled for direct current translation to the grid-cathode circuit of the kinescope 18.

The anode 60 of the video amplifier tube 54 is connected to the input of the noise pulse discriminating circuit 24 by means of an isolating resistor 66. The noise pulse discriminating circuit comprises a resistance-capacitance network including a series section having a series arm 70 comprising a resistance element 71 and a capacitance element 72 connected in parallel and coupled to a mixed section 74 comprising series capacitance reactance component 76 and a shunt resistive component 77. The resistance of the resistive component 77 is much greater than that of the resistance element 71. In the application of the invention to present day television practice, the ratio is of the order of ten to one. Likewise, the capacitance of the capacitive component 76 is much larger than that of the capacitance element 72; the ratio here being of the order of 300 to one for the same application. The time constant of the series section, which is the product of the resistance of the resistance element 71 and the capacity of the capacitance element 72 is made to be considerably greater than the width of the horizontal synchronizing pulses as experienced in time. Accordingly, the parallel combination is effectively a short circuit for horizontal synchronizing pulses but presents a high impedance to low frequencies. As stated before, the major part of the extraneous noise pulses encountered have repetition rates much lower than the repetition rate of the synchronizing pulses so that the extraneous noise pulses are greatly attenuated by the series section 70 of the discriminating circuit. Hence, the capacitance element 72 will charge on noise pulse peaks and can be rapidly discharged from the voltage to which it is charged by resistor 71 to return to normal operation after the noise pulse disappears. The time constant of the parallel circuit is therefore long in relation to the interval between sync pulses, but short in relation to the interval between noise pulses of the usual variety. Since the charging circuit presents a low impedance to the relatively high frequency synchronizing pulses, such pulses are unaffected. But to noise pulses of duration appreciably longer but of lower repetition rate than the synchronizing pulses the charging-down circuit presents substantial impedance to the noise. The capacitive component 76 eventually attains a charge just equal to the amplitude of the horizontal synchronizing pulses. Vertical synchronizing pulses will discharge the capacitive component 76 very little since the amplitude of the vertical synchronizing pulses is the same as the amplitude of the horizontal synchronizing pulses and while the duration is greater, the repetition rate is much less so that both horizontal and vertical synchronizing pulses are substantially reproduced by charging and discharging of the capacitive component 76 through the resistive component 77. Due to the low repetition rate of the usual noise pulses, the charge on the capacitive component 76 will be little affected by these noise pulses, although noise pulses of amplitude greatly exceeding the amplitude of the synchronizing pulses will appear to some extent on the capacitive component 76. The rate of charging of the capacitive component 76, however, is slow so that it will not be charged to the peak of noise as is the case with the prior art synchronizing signal separating circuits. The capacitive component 76 upon being charged to some extent by a noise pulse will ordinarily recover fully at the cessation of that pulse and before the arrival of the next suceeding noise pulse. The net effect which is utilized in the arrangement according to the invention is that a large reduction is made in the time during which the synchronizing separating circuit remains biased beyond the synchronizing peak level after the occurrence of a noise pulse and a cumulative buildup of noise bias which might otherwise cause a loss of synchronization is prevented. Because the duty cycle, that is, the portion of the noise cycle during which the noise pulse exists, is ordinarily low the average energy is low and the charging circuit does not develop appreciably sustained potential. A unilateral impedance device shown here as a vacuum tube rectifier 80 having an anode element 81 connected to the junction between the capacitor 76 and the resistive component 77 and a cathode element 82 connected to the other terminal of the resistive element 74, is arranged to clamp the composite video signal emanating from the charge down circuit to the desired reference level, which in this case is ground. The rectifier device 80 may be in the form of a germanium diode or similar semi-conductor, or the like, if desired.

The output of the noise discriminator circuit 24 is coupled by way of an isolating resistor 84 to the output circuit of the noise voltage generating portion of the I.-F. amplifier 12 by means of a coupling capacitor 86 and another isolating resistor 88. The noise pulse signals emanating from the high frequency amplifying circuit are of the opposite polarity to those passing through the noise discriminating circuit 24 so that the noise pulses are effectively cancelled at the circuti point *d*. According to the invention strong noise pulses drive the voltage of the screen grid 32 of the high frequency amplifier tube 26 negative so that the screen grid voltage drops to a low value instantaneously, developing a voltage pulse of negative polarity at the point *c* to drive the output from the noise discriminating circuit 24 at the point *d* in the negative direction.

The combined wave, which at point *d*, now essentially consists solely of horizontal and vertical synchronizing pulses, is applied to a synchronizing pulse separating circuit 20 comprising a pair of controlled electron flow path devices or electron discharge devices, shown here in the form of vacuum tubes 91 and 92 each having input circuit electrodes or grid elements, output circuit electrodes or anode elements and common circuit electrodes or cathode elements. As shown, the tube 91 is arranged to separate the vertical synchronizing pulses while the tube 92 is arranged to separate the horizontal synchronizing pulses from the composite signal, although a single tube separator could be used instead if desired. Vertical synchronizing pulses at the anode 95 are developed on the load resistors 101 and 102 and are applied by way of a coupling capacitor 103 to the grid of a vertical synchronizing pulse amplifying tube 104 of the vertical synchronizing pulse amplifier 22. In similar fashion horizontal pulses at the anode 96 are developed across the anode resistor 106 and are applied by way of a capacitor 107 to a horizontal synchronizing pulse amplifier tube (not shown).

In current television practice, the transmitted video modulated radio frequency carrier wave comprises a varying picture component and a constant blanking level corresponding approximately to absolute black. Brightness of the received picture is dependent on the amount which the picture component departs from this black blanking level. The amplitude of the synchronizing pulses is chosen to be in definite constant proportion to the amplitude of the blanking level, so that the amplitude of the synchronizing pulses is a direct indication of the strength of the carrier wave. Since the potential at the cathode 98 of the tube 92 is substantially proportional to the amplitude of the synchronizing pulses, it is, therefore, substantially proportional to the strength of carrier wave. As indicated above, this is a desired characteristic for a source of potential for an automatic gain control system. The two tubes 91, 92 also function to provide the A.-G.-C. voltage. The cathode 97 of the vertical synchronizing pulse separator tube 91 is connected to a pair of cathode resistors 111 and 112, both of which are shunted by a capacitor 113. The time constant of this resistance-capacitance combination is sufficiently long to require anode current flow for the duration of each vertical synchronizing pulse. The resistance of resistors 101, 102, and 111, 112 provide such a large resistance ratio that there is effectively no change of charge on the capacitor 113 by the vertical separator tube 91 conduction during the vertical synchronizing pulse intervals. The horizontal separator tube 92 has a low value of resistance in resistor 106 coupled to the anode 96 so that the current flowing through the horizontal synchronizing separator tube current is large enough to maintain bias at the cathode circuit comprising resistors 111, 112 and the capacitor 113 effectively dependent upon the horizontal separator tube 92 alone. The horizontal and vertical channels are therefore effectively divorced in operation with the exception that the vertical separator section has a portion of the cathode bias derived from horizontal separator tube 92, which is desirable for permitting improved recovery of the vertical tube 91 to noise pulses. A variable resistor 116 connected to the grid 94 and through the resistors 89 and 90 to the grid 93 to control the A.-C. and D.-C. voltages of both grids. The voltage on the cathode 98 of the horizontal synchronizing pulse separating tube 92 is proportional to the signal strength of the received signal and is applied to an A.-G.-C. amplifier tube (not shown) to furnish the A.-G.-C. voltages for the television receiver.

A resistor 118 and a capacitor 119 comprise an A.-G.-C. voltage filter which in conjunction with the capacitor 117 forms a short time constant combination to prevent the voltage on the cathode 98 from reaching a value higher than signal for only a very short time so that no serious harm is done to either A.-G.-C. voltage or the horizontal scanning function. Since the cathode time constant is short, the circuit is highly degenerative to the vertical synchronizing signals. That is, the cathode capacitor 117 charges up to the peak of the vertical synchronizing pulse amplitude in a few microseconds and no further anode current flows during the remainder of the vertical synchronizing pulse. The variable resistor 116 serves as a level setter for the A.-G.-C. control voltage developed by the horizontal synchronizing pulse separating tube 92 acting as a cathode follower. The capacitor 117 in the cathode circuit of the tube 92 is charged to the peaks or nearly to the peaks of the horizontal synchronizing pulses. Direct current voltage, proportional to the received signal amplitude, is taken from the cathode 98 and inverted in the A.-G.-C. amplifier tube (not shown) so that on strong received signals, the output of the amplifier is more negative and is, therefore, in the proper direction to serve as an A.-G.-C. voltage.

The circuit arrangement according to the invention is particularly advantageous in the reception of weak signals. When the video signals are weak, the noise impulses at the synchronizing pulse separating circuit are of higher amplitude than the video signal and unless complicated clipping circuits are provided the noise impulses may cause spurious responses in the operation of the synchronizing separator.

To insure proper polarity an odd number of video amplifier stages should be used between the demodulating circuit and the noise discriminating circuit, although if considered desirable the polarity may be inverted by the use of a transformer or other polarity inverting circuits known to the art may be used. Because it is of importance to keep the noise pulses in the same phase at the cancellation point to insure complete cancellation and to provide the highest available amplitude, it is preferable to take these pulses from the final high frequency amplifier circuit to prevent the possibility of phase shift in a greater number of amplifier stages subsequent to the noise takeoff point, although this may be done if it is considered desirable.

The circuit arrangements according to the invention are extremely economical and simple means for securing a high degree of noise immunity with minimal circuit changes which are easily adaptable to inclusion in television receivers of the type currently manufactured. In addition to immunity of the synchronization system to noise, without the addition of any further circuit components, the invention simultaneously renders the automatic gain control system substantially noise immune.

Figures 3, 4:
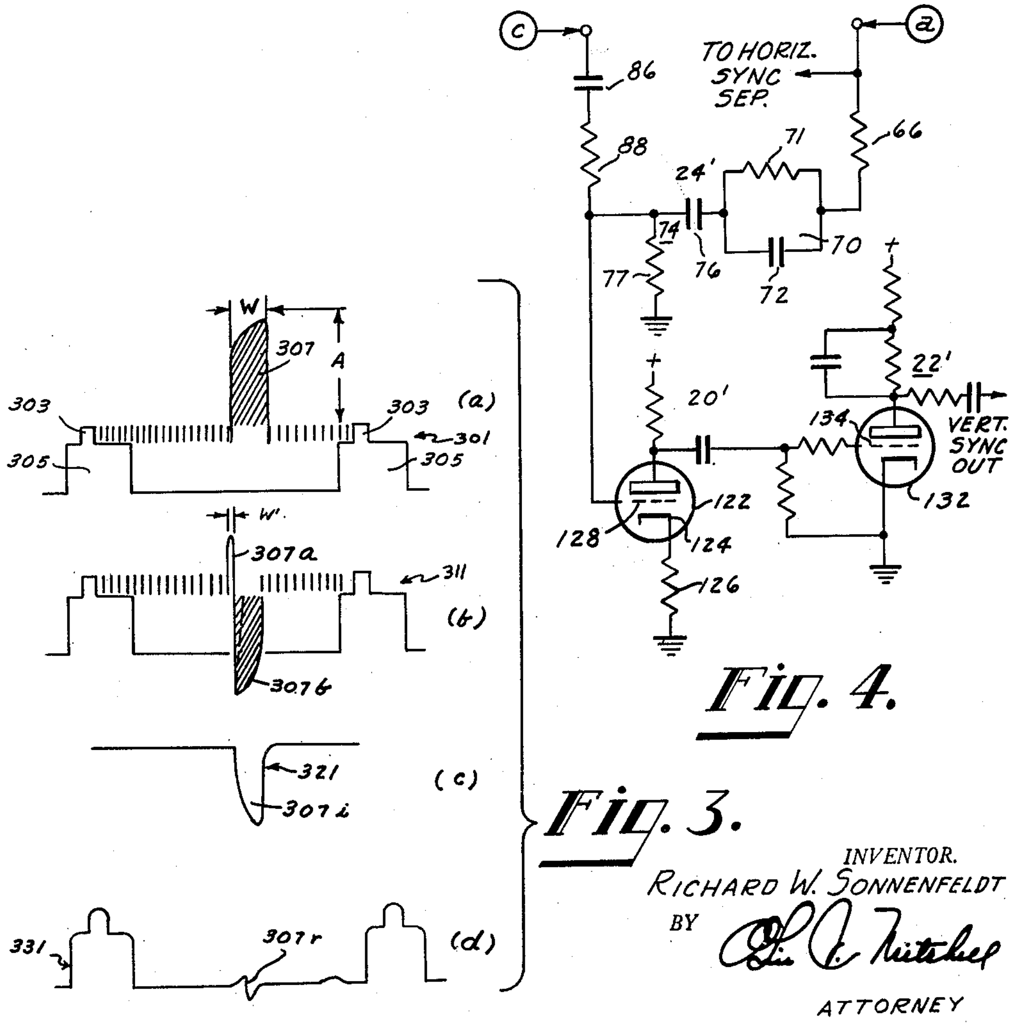
Fig. 3 is a graphical representation of pertinent waveforms obtained with the circuit arrangement of Fig. 2.
Fig. 4 is a schematic diagram of a portion of the circuit of Fig. 2 which comprises an alternate embodiment of the circuit arrangement according to the invention.

Referring to Fig. 3 there is shown a graphical representation of certain wave forms pertinent in the explanation of the invention. The curve 301 shows a portion of the composite video signal having vertical synchronization pulse portions 303 superimposed on the blanking pedestals 305 between which the video signal components or picture information is present but which is not shown here inasmuch as this does not affect the invention. The curve portion 307 represents extraneous impulse noise which is often encountered in video frequency amplifiers. This noise is of original width *w* and original amplitude *a*, this amplitude being taken with reference to the maximum amplitude of the synchronizing pulses represented by the curved portions 303. The curve 301 represents the wave form at the anode 60 of the video amplifier tube 54, which wave is presented at the inputs of the noise discriminating circuit 24. The curve 311 depicts the waveform at the output of the noise discriminating circuit. The synchronizing pulses represented by the curve portions 303 have been translated by the noise discriminating circuit 24 with substantially unchanged characteristics. Operation of this circuit causes the remaining impulse noise signal to be of width *w'* much narrower than previously as indicated by the pulse 307*a* and a large negative going portion 307*b* to be developed. The curve 321 represents the noise voltage at the screen grid 32 of the high frequency video modulation amplifier tube 26. The noise pulse 307*i* is seen to be of opposite polarity to the noise pulse 307*a* which is obtained at the output of the noise discriminating circuit 24. The curve 331 represents the result of combining the wave forms shown by the curves 311 and 321 for application to the input of the synchronizing pulse separating circuit 20. It is noted that the only noise components left is represented by the curve portion 307*r* wherein the width and amplitude of these noise pulses is so small relative to the original values as to be ineffective upon the operation of the synchronizing pulse separating circuit.

Referring to the circuit arrangement shown in Fig. 4 it is seen that in certain circumstances an alternate circuit arrangement might be used to reduce the number of component parts required. Such a circuit is of advantage where a synchronizing pulse separating circuit 20' having an input tube 122 of which the cathode 124 is connected to the point of reference potential by means of an impedance element 126 is used, where that impedance is extremely low with respect to the impedance of the tube 122 during conduction. In most practical arrangements the cathode 124 will be connected directly to ground, but it must be understood that in some instances an impedance element of small value may exist between the cathode and ground. By means of this circuit the clamping diode is formed between the grid 128 and the cathode 124 thus eliminating the need for a separate diode. The circuit arrangement of Fig. 4 is substituted for the lower part of the circuit arrangement of Fig. 2 at the points *a* and *c*. The output of the vertical pulse separating tube 122 is connected to vertical synchronizing pulse amplifier tube 132 at the grid 128, which amplifier is entirely conventional in all respects.

The listed values of circuit components for use in the circuit arrangement of Fig. 2 have been found to produce satisfactory operation of the invention and are set forth by way of example only.

| Ref. No. | Component | Value or Type |
|---|---|---|
| 26 | I.-F. amplifier tube | 6CB6. |
| 34 | screen resistor | 27 kilohms. |
| 36 | screen capacitor | 470 mmf. |
| 42 | anode resistor | 1,000 ohms. |
| 44 | anode capacitor | 4,700 mmf. |
| 45 | cathode resistor | 180 ohms. |
| 46 | cathode capacitor | 4,700 mmf. |
| 66 | isolating resistor | 18 kilohms. |
| 71 | filter resistor | 270 kilohms. |
| 72 | filter capacitor | 330 mmf. |
| 76 | do | 0.1 mf. |
| 77 | filter resistor | 2.2 megohms. |
| 80 | clamping diode | 1N34 or ½ 6AL5. |
| 84 | isolating resistor | 22 kilohms. |
| 86 | coupling capacitor | 0.033 mf. |
| 88 | isolating resistor | 33 kilohms. |
| 89 | do | 560 ohms. |
| 90 | do | 33 kilohms. |
| 91–92 | separator tubes | 6SN7. |
| 111 | cathode resistor | 220 kilohms. |
| 112 | do | 150 kilohms. |
| 113 | cathode bypass | 0.022 mf. |
| 116 | A.-G.-C. control | 27–77 kilohms. |
| 117 | cathode capacitor | 0.01 mf. |
| 101 | load resistor | 120 kilohms. |
| 102 | do | 1 megohm. |
| 103 | coupling capacitor | 0.047 mf. |
| 106 | load resistor | 1.2 kilohms. |
| 107 | coupling capacitor | 0.001 mf. |

The power supply delivered 265 volts positive at the points marked with the plus (+) sign.

The invention claimed is:

1. A television receiving circuit arrangement including a high frequency wave signal amplifying circuit arranged for linear operation for normal amplitude video signal modulated wave signals applied thereto and for nonlinear operation for noise pulses of amplitude greater than said normal amplitude thereby to demodulate said noise pulses, a video signal amplifying circuit, means coupled between said high frequency wave signal amplifying circuit and said video signal amplifying circuit to recover said video signal and noise pulse at the output of said video signal amplifying circuit in polarity opposite to that of said pulses demodulated in said high frequency wave signal amplifying circuit, a pulse discriminating network comprising a resistance element and a capacitive element connected in parallel in one arm of said network, a resistance component substantially larger by a given factor than said resistance element shunted across the arms of said network, a capacitive component substantially larger by the square of said given factor than said capacitive element connected in series in one arm, a unilateral impedance device having a cathode electrode connected to one terminal of said resistance component and another electrode coupled to the other terminal, a utilization circuit coupled between said other electrode of said unilateral impedance device and the one terminal of said resistance component, means to apply the output of said video signal amplifying circuit to a point on said one arm of said discriminating network, and means to apply the noise pulses recovered by demodulation in said high frequency wave signal amplifying circuit to a point on said one arm substantially to cancel said noise pulses from said utilization circuit.

2. A television receiving circuit arrangement including a high frequency wave signal amplifying circuit arranged for linear operation for normal amplitude video signal modulated wave signals applied thereto and for nonlinear operation for noise pulses of amplitude greater than said normal amplitude thereby to demodulate said noise pulses, a video signal amplifying circuit, means coupled between said high frequency wave signal amplifying circuit and said video signal amplifying circuit to recover said video signal and noise pulse at the output of said video signal amplifying circuit in polarity opposite to that of said pulses demodulated in said high frequency wave signal amplifying circuit, a pulse discriminating network comprising a resistance element and a capacitive element connected in parallel in one arm of said network, a resistance component substantially ten times as large as said resistance element shunted across the arms of said network, a capacitive component substantially three hundred times as large as said capacitive element connected in series in one arm, a unilateral impedance device having a cathode electrode connected to one terminal of said resistance component and another electrode coupled to the other terminal, a utilization circuit coupled between said other electrode of said unilateral impedance device and the one terminal of said resistance component, means to apply the output of said video signal amplifying circuit to a point on the input of said discriminating network, and means to apply the noise pulses recovered by demodulation in said high frequency wave signal amplifying circuit to a point on the output of said discriminating network substantially to cancel said noise pulses from said utilization circuit.

3. A television receiving circuit arrangement including, a high frequency wave signal amplifying circuit comprising an electron discharge structure having at least cathode, control, screen and anode electrodes, means to apply a high frequency video signal modulated wave signal between said control and cathode electrodes, means to bias said high frequency amplifying structure to derive the video signal components including noise pulses at the screen electrode thereof, an output load device coupled between said anode and cathode electrodes, means coupled to said output load device to derive the video signal components including noise pulses, a video signal amplifying circuit comprising an electron discharge system having at least cathode, grid and anode electrodes, said cathode and grid electrodes being connected to said video signal component deriving means, said video signal component deriving means being poled to produce said video signal components and noise pulses at the anode electrode of said electron discharge system in opposite polarity from the components and pulses as derived at said screen electrode of said electron discharge structure, a noise pulse discriminating network connected to the anode electrode of said electron discharge system, said discriminating network comprising a resistance element and a capacitive element connected in parallel in one arm of said network, a resistance component substantially ten times as large as said resistance element shunted across the arms of said network, a capacitive component substantially three hundred times as large as said capacitive element connected in series in one arm, a unilateral impedance device shunted across said resistance component and comprising a cathode element connected to one arm terminal of said resistance component and another element connected to the other terminal, means including resistive and capacitive components connected in series between said screen electrode of said electron discharge structure and the other element of said unilateral impedance device to cancel noise pulses thereat, and means coupled to said noise pulse discriminating circuit to separate the synchronizing pulses from said video signal components.

4. A television receiving circuit arrangement including, a high frequency wave signal amplifying circuit comprising an electron discharge structure having at least cathode, control, screen and anode electrodes, means to apply a high frequency video signal modulated wave signal between said control and cathode electrodes, means to bias said high frequency amplifying structure to derive the video signal components including noise pulses at the screen electrode thereof, an output load device coupled between said anode and cathode electrodes, a diode detector element coupled to said output load device to derive the video signal components including noise pulses, a video signal amplifying circuit comprising an electron discharge system having at least cathode, grid and anode electrodes, said cathode and grid electrodes being coupled to said diode detector element, said diode detector element being poled to produce said video signal components and noise pulses at the anode electrode of said electron discharge system in opposite polarity from the components and pulses as derived at said screen electrode of said electron discharge structure, an electron discharge device having a cathode, grid and anode elements, a network comprising a resistance element and a capacitive element connected in parallel, means connecting a resistive element, said network and a capacitive component substantially three hundred times as large as said capacitive element in series between the anode electrode of said electron discharge system and the grid element of said electron discharge device, a resistance component substantially ten times as large as said resistance element coupled between the cathode and grid elements of said electron discharge device, and means including a resistive component connected between said screen electrode of said electron discharge structure and a point on said series connection at which noise pulses appear reduced in amplitude with respect to the amplitude at the anode of said electron discharge system to cancel noise pulses thereat, and means coupled to the electrodes of said electron discharge device to separate the synchronizing pulses from said video signal components.

5. A television receiving circuit arrangement including, a high frequency wave signal amplifying circuit comprising an electron discharge structure having at least cathode, control, screen and anode electrodes, means to apply a high frequency video signal modulated wave signal between said control and cathode electrodes, means to bias said high frequency amplifying structure to derive the video signal components including noise pulses at the screen electrode thereof, an output load device coupled between said anode and cathode electrodes, a diode detector element coupled to said output load device to derive the video signal amplifying circuit comprising an electron discharge system having at least cathode, grid and anode electrodes, said cathode and grid electrodes being coupled to said diode detector element, said diode detector element being poled to produce said video signal components and noise pulses at the anode electrode of said electron discharge system in opposite polarity from the components and pulses as derived at said screen electrode of said electron discharge structure, a network comprising a resistance element and a capacitive element connected in parallel, means connecting a resistive element, said network and a capacitive component substantially three hundred times as large as said capacitive element and a resistance component substantially ten times as large as said resistance element connected in series between the anode and cathode electrodes of said electron discharge system, an electron discharge device having cathode, and anode elements coupled across said resistance component, and means including capacitive and resistive components connected in series between said screen electrode of said electron discharge structure and the anode element of said electron discharge device to cancel noise pulses thereat, and means coupled to the electrodes of said electron discharge device to separate the synchronizing pulses from said video signal components.

6. A television receiving circuit arrangement including, a high frequency wave signal amplifying circuit comprising an electron discharge structure having at least cathode, control, screen and anode electrodes, means to apply a high frequency video signal modulated wave signal between said control and cathode electrodes, means to bias said high frequency amplifying structure to derive the video signal components including extraneous noise pulses at the screen electrode thereof, an output load device coupled between said anode and cathode electrodes, means coupled to said output load device to derive the video signal components including noise pulses, a video signal amplifying circuit comprising an electron discharge system having at least cathode, grid and anode electrodes, said cathode and grid electrodes being connected to said video signal component deriving means, said video signal component deriving means being poled to produce said video signal components and noise pulses at the anode electrode of said electron discharge system in opposite polarity from the components and pulses as derived at said screen electrode of said electron discharge structure, means including an electron discharge device having cathode, grid and anode elements arranged to separate the synchronizing pulses from said video signal components, a noise pulse discriminating network interconnecting the anode electrode of said electron discharge system and the grid element of said electron discharge device, said discriminating network comprising a resistance element and a capacitive element connected in parallel in one arm of said circuit, a resistance component substantially ten times as large as said resistance element shunted across the arms of said circuit, a capacitive component substantially three hundred times as large as said capacitive element connected in series in one arm, and means including resistive and capacitive components connected in series between said screen electrode of said electron discharge structure and the grid element of said electron discharge device to cancel noise pulses thereat.

References Cited in the file of this patent

Rider's Television Manual, vol. 12, Motorola TV, pages 12–26, copyrighted November 16, 1953.